US007410421B2

(12) United States Patent
Mathis

(10) Patent No.: US 7,410,421 B2
(45) Date of Patent: Aug. 12, 2008

(54) PROGRESSIVE METER SYSTEM ARCHITECTURE AND METHOD

(76) Inventor: Richard M. Mathis, 9773 Lost Colt Cir., Las Vegas, NV (US) 89117

( * ) Notice: Subject to any disclaimer, the term of this patent is extended or adjusted under 35 U.S.C. 154(b) by 776 days.

(21) Appl. No.: 10/631,108

(22) Filed: Jul. 31, 2003

(65) Prior Publication Data

US 2005/0026691 A1 Feb. 3, 2005

Related U.S. Application Data

(60) Provisional application No. 60/400,299, filed on Jul. 31, 2002.

(51) Int. Cl.
*G06F 17/00* (2006.01)

(52) U.S. Cl. .......................................................... 463/37

(58) Field of Classification Search .................. 463/37, 463/16–23, 42, 25–29
See application file for complete search history.

(56) References Cited

U.S. PATENT DOCUMENTS

| | | | | |
|---|---|---|---|---|
| 5,083,800 | A * | 1/1992 | Lockton | 463/42 |
| 7,314,108 | B2 * | 1/2008 | Kuki et al. | 180/84 |
| 2002/0115487 | A1 * | 8/2002 | Wells | 463/42 |
| 2005/0014553 | A1 * | 1/2005 | Byrne | 463/18 |
| 2006/0123174 | A1 * | 6/2006 | Nguyen et al. | 710/301 |
| 2006/0194633 | A1 * | 8/2006 | Paulsen | 463/43 |
| 2007/0060314 | A1 * | 3/2007 | Baerlocher et al. | 463/25 |
| 2007/0218975 | A1 * | 9/2007 | Iddings et al. | 463/25 |
| 2008/0020834 | A1 * | 1/2008 | Breckner et al. | 463/27 |
| 2008/0032764 | A1 * | 2/2008 | Cannon | 463/16 |

* cited by examiner

*Primary Examiner*—Ronald Laneau
(74) *Attorney, Agent, or Firm*—Fliesler Meyer LLP

(57) ABSTRACT

A method of constructing a link progressive meter system to increase participation and generate additional player excitement during a progressive type game. Each interface or monitor to a gaming machine or monitored point can act and process decisions independently of other monitors. Each monitor contains in computer data memory the status of the entire network and this is replicated throughout the entire network. A method for a bonus game that may be implemented upon an individual gaming apparatus or upon a link progressive network connecting a plurality of gaming machines is described.

13 Claims, 7 Drawing Sheets

PROGRESSIVE METER SYSTEM ARCHITECTURE AND METHOD

CROSS REFERENCE TO RELATED APPLICATIONS

The present application is based on and claims priority from provisional application, Application No. 60/400,299, entitled Progressive Meter System Architecture and Method, filed Jul. 31, 2002.

BACKGROUND OF THE INVENTION

The present invention is related generally to casino gaming systems and more specifically to casino gaming progressive meter systems and methods. Conventional progressive gaming systems are generally known in which multiple gaming devices are interconnected and bonus games and/or an incrementally varying jackpot amount based on a percentage of total amounts played can be won. Generally, the gaming devices report coin-in and game-win information, which enable jackpot increments to be generated for transmission back to the gaming devices. While progressive gaming systems have proved successful, the prospect for increased participation by current or additional players and increased generation of excitement continue to exist. A conventional progressive gaming system typically has a central controller that communicates with nodes at each gaming machine or input device to which the system is connected. A progressive meter system may typically have a node or monitoring device in a gaming machine that reads data from the gaming machine and communicates the data to a central controller for processing of the data. Decisions made upon the basis of the data by the central controller are generally of a predetermined nature and may be of a type to encourage and enhance player participation. Payment of a large award (progressive jackpot) upon a game upon a gaming machine arriving at a predetermined outcome is a common function of a progressive meter system. Amount of the large progressive jackpot is typically derived by assigning a percentage of each coin played upon any gaming machine being attached to the progressive system (the progressive link) for summation into the progressive jackpot that is then prominently displayed to players to enhance the playing experience. It is known that administrators of such conventional progressive systems have encountered difficulty in retrieving centrally stored data to accomplish proper functioning of the gaming system. This situation can occur, for example, when stored data becomes corrupt or becomes lost for any number of reasons; accordingly, multiple copies of data reside upon the central controller and are checked against each other frequently. Nevertheless, it is believed that such conventional gaming systems were popular not only because controller costs were generally high but also due to the increased complexity required to implement decentralized processing systems.

Gaming jurisdictions may require that any progressive jackpot displayed be available for win and that the probability of a winning outcome be the same from game to game on any gaming apparatus playing a progressive game. Consequently, display of a progressive jackpot available for win that is not correct (larger than actual value) can result in a large loss for an operator of gaming machines since many gaming jurisdictions will require that it be paid if won before the amount displayed can be adjusted downward.

There are three recognized categories into which a progressive meter system may be classified: stand-alone, link progressive and wide area progressive (WAP). A stand-alone progressive meter is connected only to a single gaming apparatus and performs its actions based solely upon data from the gaming apparatus to which it is connected. A link progressive system connects multiple gaming machines and data from all connected machines is processed at a central controller. A link progressive typically connects only machines that are locally present upon a gaming property. A wide area progressive (WAP) connects many gaming machines at many properties and may include local link progressive systems at properties connected to the WAP. An example of a WAP is Megabucks® which is registered, owned and operated by International Game Technology.

Generally link progressive meter systems and WAPs communicate with the central controller through known methods and protocols. In the case of a link progressive system, communication is normally by some sort of serial data link. In the case of a WAP, communication with the central controller is through leased telecommunications lines or channels. Every effort is made to communicate a major event to the central controller as quickly as possible. Generally the major event is the win of a large award by a player of a machine connected to the link progressive system, to the WAP or both. There is a great amount of concern that multiple games connected to a link could win a large progressive award simultaneously or at least within a few seconds of each other. Typically when a win of the progressive award occurs, the gaming apparatus attached to the link signals the central controller that the win has occurred, the gaming apparatus upon which the winning game was played is prevented from further play, the amount of award that is available for win by any other device connected to the link is adjusted to a predetermined amount (reset amount) and the reset amount is communicated by the central controller to all devices connected to the link. This procedure is common to all progressive meter systems. Payment of the large progressive win is normally made immediately to the player of the game that won the award. Therefore, there is a need to resolve one or more of the aforementioned disadvantages of conventional gaming systems and the present invention meets this need.

SUMMARY OF THE INVENTION

To address one or more aforementioned drawbacks and disadvantages of conventional gaming systems, a system of constructing a link progressive controller network is disclosed. An advantage of this system is to increase participation and generation of additional excitement for progressive type games. Another advantage of the present invention is that loss of stored data is either eliminated or reduced to a minimum since no central or master controller is needed. Further, the security risk of having just one point of entry to compromise the system is eliminated. Each monitor (gaming device or connectable to a gaming device) contains in computer data memory the entire status of the connected network. The present system includes provision of a bonus game that may be played upon an individual gaming apparatus or upon a link progressive network.

In one aspect of the present invention, a progressive gaming system is provided. The progressive gaming system includes a first gaming device having an input device, a display and a controller. The first gaming device can receive a wager from a first player to initiate a progressive type game. The progressive gaming system also has a second gaming device having an input device, a display and a controller. Here, the second gaming device is connected to the first gaming device via a communication link. The communication link may be wireless, wired, e.g., RS232, Internet or other type connectivity capable of allowing data transmission and receipt between two points.

The second gaming device can also receive a wager from a second player to initiate a progressive type game. Upon initiation of gaming, the first and second gaming devices exchange, with each other, information associated with the amount of wagers placed by the first and the second player on each respective gaming device by exchanging an electronic data packet of a predetermined format, in order to determine the total jackpot amount to be won. The determination of the total jackpot amount to be paid to the first player is performed by the controller of the first gaming device. Similarly, determination of the total jackpot amount to be paid to the second player is performed independently of the first gaming device by the controller of the second gaming device. Communication between the first and second gaming devices as to total amount available for pay to players is accomplished through the exchange of a data packet after which either gaming device may make a calculation as to amount to be paid according to predetermined parameters.

A further understanding of the nature and advantages of the present invention herein may be realized by reference to the remaining portions of the specification and the attached drawings. References to "steps" of the present invention should not be construed as limited to "step plus function" means, and are not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

The present invention in the form of one or more exemplary embodiments will now be described. Consider a link progressive system that connects a plurality of monitors of gaming devices via a communication bus. The communication bus may comprise a physical wire connection or may comprise wireless means such as radio frequency (RF), infrared (IR). The monitors of gaming devices may be a device separate from a gaming apparatus or may be integrated into and be a part of the gaming apparatus. Each monitor is an intelligent device and comprises a unit for communicating with the gaming apparatus to which it is attached, a unit for decision making based upon calculated or predetermined conditions, a unit for communicating with other monitors to which it may be connected and a unit for communicating with peripherals that may be attached to enhance its function.

Figure 1:
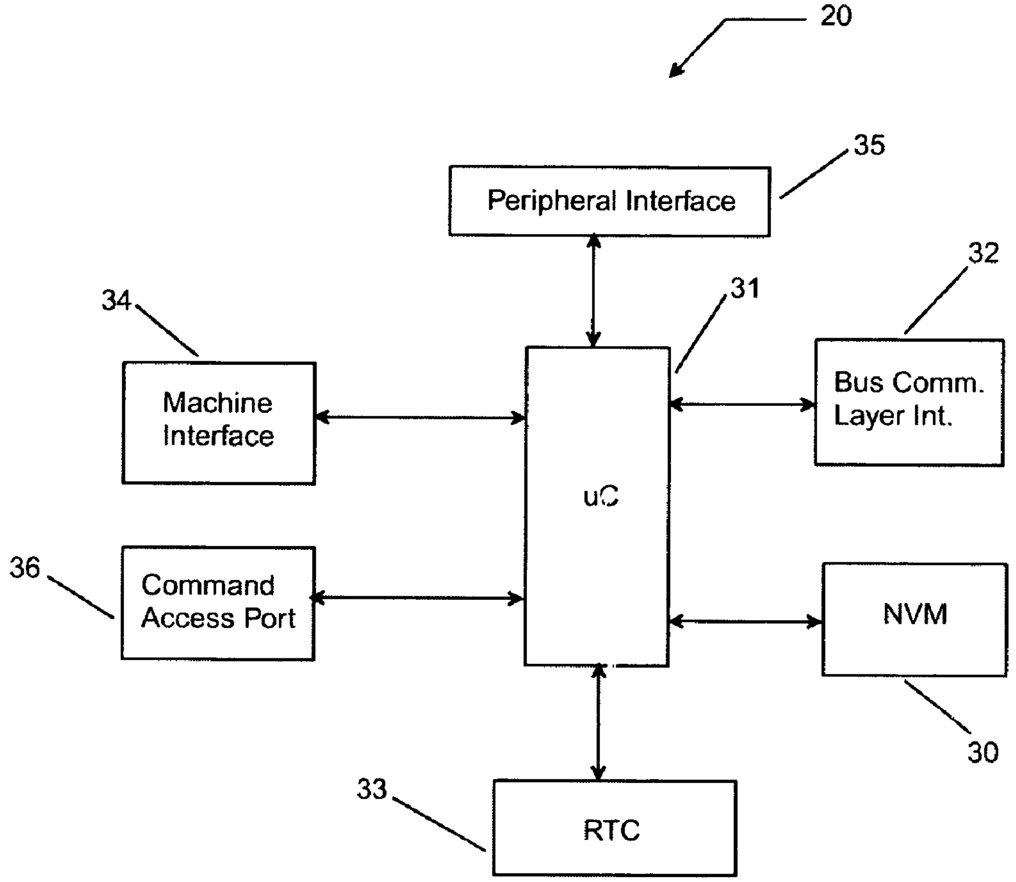
FIG. 1 shows a block diagram of a monitor of a gaming device according to an exemplary embodiment of the present invention.

A block diagram of a monitor of a gaming device as described in the present invention may be as shown in FIG. 1. The monitor 20 may be comprised of a microcontroller 31, a real time clock (RTC) 33, a communications layer interface device 32, a machine interface component 34, a peripheral interface component 35, and a local access port 36. Microcontroller 31 may be an electronic chip or component comprising a microprocessor, program memory, a unique electronic identification, and data random access memory (RAM); the microcontroller may thus be a microcomputer capable of independently running a program stored in program memory, performing actions and making decisions as dictated by the program. Nonvolatile memory component (NVM) 30 provides means for permanent storage of data that may change and can be read and written by the microcontroller. Machine interface component 34 allows the monitor to establish electronic communication with a gaming machine with which it may be associated. Communications layer interface device 32 provides a unit for the monitor to communicate with other monitors in a distributed network. Real time clock 33 provides a unit to time synchronize the monitor with other monitors in any other network. Peripheral interface component 35 may provide a unit to communicate with devices such as in-game displays, progressive displays and other devices used to attract players and enhance player enjoyment. Local access port 36 may provide a unit to communicate with the monitor to obtain status information and to load a local parameter table 23 or to communicate with a central data gathering system.

Figure 2:
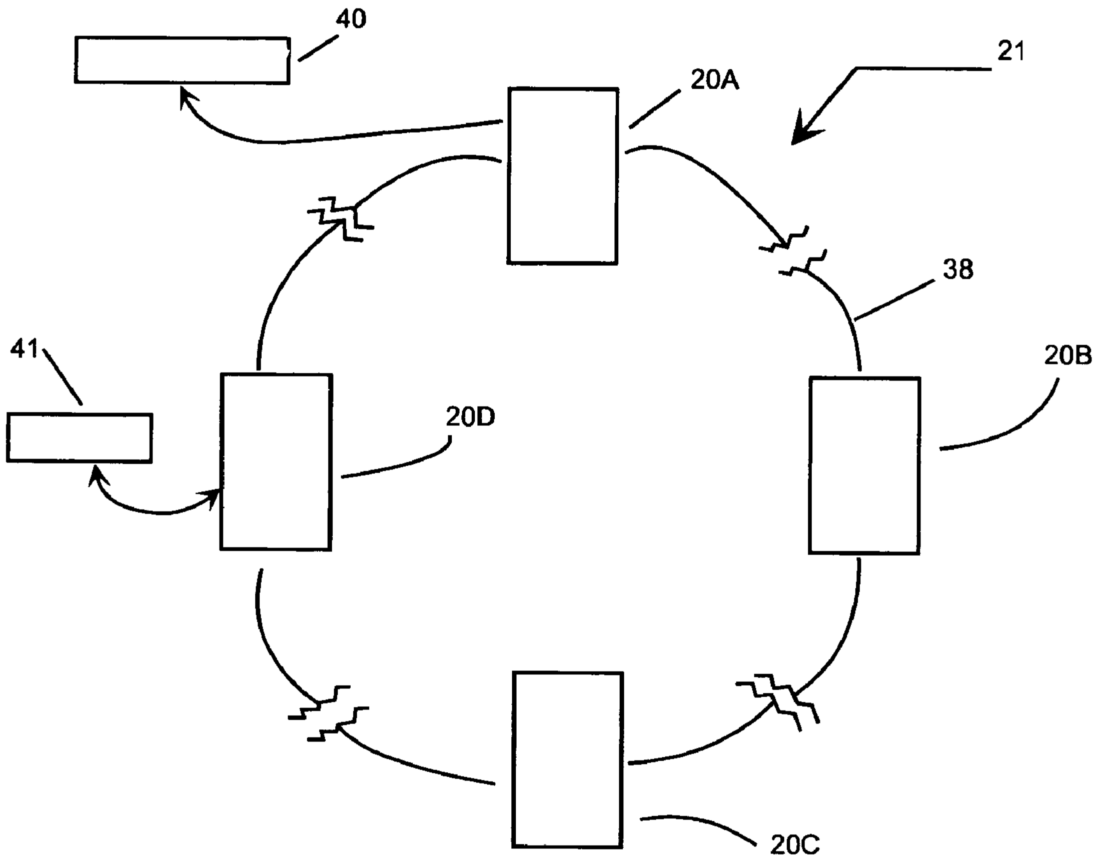
FIG. 2 shows a block diagram representation of a network of individual monitors of gaming apparatus.

Turning now to FIG. 2, which is a block diagram representation of a network of monitors 20. Monitors 20A-20D may all be in communication via a communications link 38, but do not necessarily communicate in any set order; additionally there is no set number of monitors included in the network. All monitors communicate upon a peer-to-peer basis. The communications link may be any type of link well known in the art such as a hard-wired serial bus, RF, or infrared, but not limited to any of the previously mentioned methods. When a monitor has an event to report, the monitor places the event in a predetermined format and communicates it to the network. Arbitration as to availability of the communications network connecting the monitors may be either by using token passing or by monitoring electrical levels on the physical bus, as is done in the well-known protocol I2C or the well-known protocol termed Computer Area Network. Arbitration reduces or prevents collisions of data that may be caused by multiple devices attempting to transmit a message upon the network simultaneously.

FIG. 2 illustrates at 40 connection of a monitor by a unit 35 to an external peripheral 40; the peripheral may be, but not limited to, a progressive meter display, audio attraction device, etc. A block representation of external communication with the progressive meter network is provided at 41;

which may be, but is not limited to, a portable device or network computer device communicating with the progressive meter network.

Figure 3:
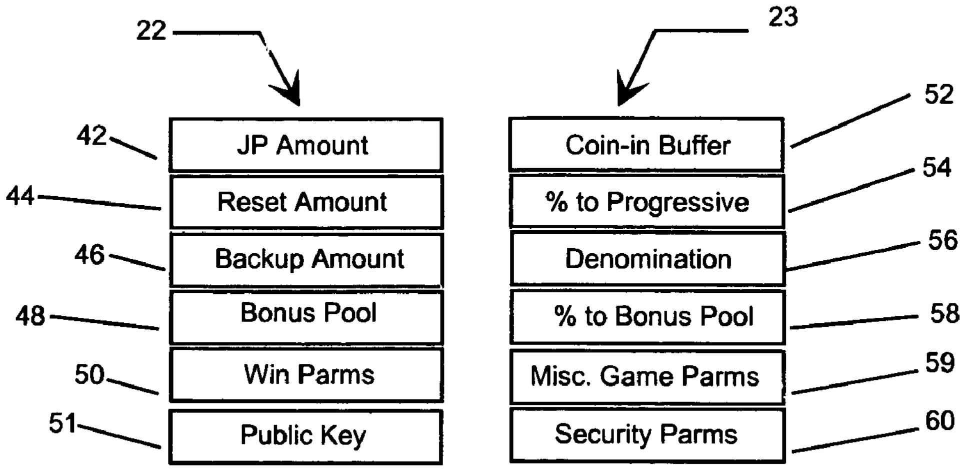
FIG. 3 is a representation of a general parameter table that may be loaded into all monitors in a progressive meter network and a specific parameter table that may be loaded into a monitor included within a network according to an exemplary embodiment of the present invention.

Turning now to FIG. 3, which is a representation of a general parameter table 22 that may be loaded into all monitors in a progressive meter network and a specific parameter table 23 that may be loaded into a monitor included within a network. The general parameter table provides common bounds which may be utilized by a program running on microcontroller 31 of any monitor included in a network to perform desired actions. The specific parameter table allows the program running within a monitor to perform desired actions specific to the device to which the monitor is connected. The specific parameter table may be different for each monitor included within the progressive meter network.

Examining more closely specific parameter table 23; positions in microcontroller 31 nonvolatile memory may be assigned, but not limited to, to coin-in-buffer 52, percent-to-progressive 54, denomination of gaming apparatus 56, percent-to-bonus pool 58 and security parameters 60. The parameters are dependent upon a specific gaming apparatus that communicates with a particular monitor 20. The parameters may be different for each monitor.

Examining more closely general parameter table 22, positions in microcontroller 31 nonvolatile memory may be assigned, but not limited to, total jackpot amount to be displayed 42, reset amount to be displayed 44, backup amount to start a display from 46, bonus pool 48, win parameters 50, and public key 51. The parameters may be the same for each monitor.

A simple example of operation of a progressive meter network according to the present invention is as follows:

Assume a total jackpot amount to be displayed to be $1000.00 (one thousand dollars). The amount is common to all nodes included within the network. Assume that a coin-in-buffer amount of 1 is present in a specific parameter table of a monitor. The monitor checks to see that a coin-in-buffer is greater than a specific amount, sums the amount in the coin in buffer with the jackpot amount to be displayed and waits for the network traffic to be clear at which point the jackpot amount to be displayed is transmitted to the entire network. The transmitting monitor waits for an acknowledgement from any other monitor on the network and when the acknowledgement is received clears its coin-in buffer to zero. Total jackpot amount to be displayed 42 is replaced by the jackpot amount just received in general parameter table 22 in all connected monitors which causes total jackpot available for win to be updated among all monitors connected to a network. A backup coin-in buffer may be included in the monitor microcontroller memory structure to allow for a long time between transmission and an acknowledgement. The backup coin-in buffer alternates position with the coin-in buffer as the active coin-in buffer. If multiple coins accrue in the coin-in-buffer, the amount is summed and the monitor waits for a transmission slot on the network. If there is no traffic on the network for a specific period of time, monitors generate random "I'm here" transmissions for purpose of assuring that the network is connected to all monitors. If, after a predetermined amount of time elapses, a monitor does not receive any communication from any device the program assumes that it is off the network and it may enter the stand-alone progressive mode with a new set of program rules or it may simply shut down any display functions it may have.

In another example, assume that a progressive jackpot is hit at a particular gaming machine included in a progressive meter network according to the present invention. An electronic signal is sent by the gaming machine to a monitor attached to it and will be received and interpreted by the monitor. The monitor sends an electronic data packet onto the progressive system network that will be interpreted by all included monitors as a jackpot signal and program running on microcontrollers included in the monitors will cause total jackpot amount to be displayed 42 to be overwritten with a current value that is in reset amount to be displayed 44. The value in reset amount to be displayed as modified by predetermined or calculated values as determined by the program running within the monitors becomes the new maximum award value that is available for win by a player playing a gaming apparatus included within the progressive meter network. A central controller is neither utilized nor is it required in the progressive meter network of the present invention. That is, unlike conventional systems, there is no central controller for the system, and there is no centralized data storage. Each monitor coupled to a gaming device has an independent controller. Data such as information relating to general and specific parameters necessary for implementing the progressive network is locally stored. In this manner, unlike conventional systems, loss of stored data is either eliminated or reduced to minimum. Moreover, communication between monitors becomes more efficient and can occur at a more rapid pace. Communication with a central data gathering system for audit purposes, for change of program parameters of the program running at each monitor or even for change of program running at each monitor may be by means of local access port 36.

Figure 6:
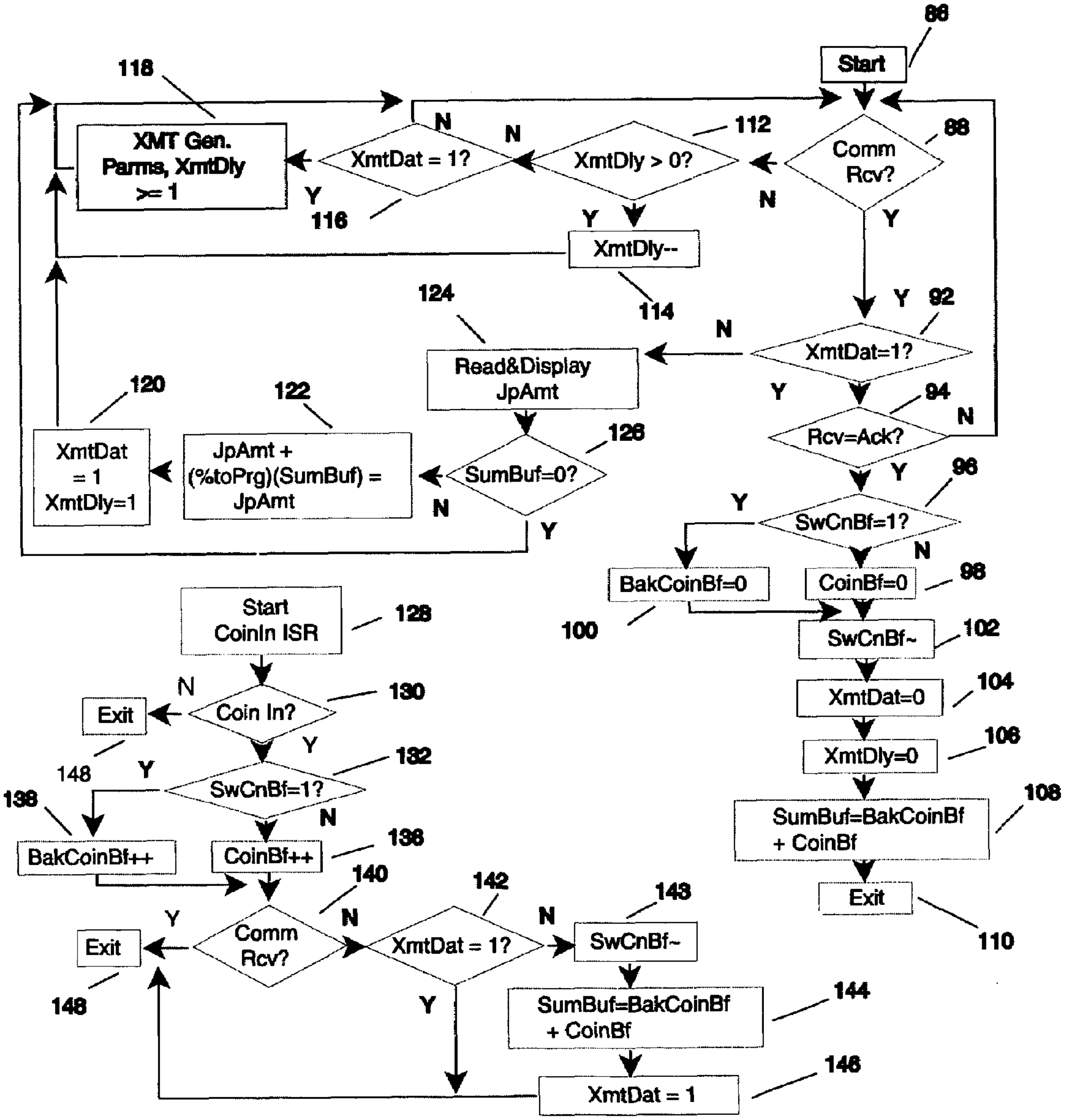
FIG. 6 is a flowchart representation of a portion of a program for purposes of updating current award amount that may run upon a monitor included within a progressive meter network.

Turning now to FIG. 6, which is a flowchart representation of a portion of a program for purposes of updating current award amount that may run upon a monitor included within a progressive meter network of the present invention; the program begins at 86 where initialization of parameters is performed and proceeds to 88 where the program monitors the progressive meter network communication layer 38, for incoming data or to determine if the monitor can transmit data without colliding with a data stream from another connected monitor that is currently transmitting. If no traffic is present upon the communication layer, the program continues to 112 to check status of a delay buffer that may contain a period of time to delay transmitting data if the communication layer is clear. If, at 112, no delay prior to transmitting data is indicated, the program proceeds to check a flag at 116 that indicates that data is available to be transmitted and, if the flag is not set, the program returns to 88. If the flag indicating that data is available to be transmitted is set, the program proceeds to 118 where updated general parameter table 22 is transmitted and transmit delay is set to greater than, or equal to, one for purpose of allowing reception of an acknowledge by another monitor on the progressive meter network. Program returns to 88 and, if no transmission is detected upon the network communication layer, will wait a predetermined period time before transmitting again since the transmission delay buffer, which is decremented at 114, is not equal to zero at 112. If, at 88, data is present upon the communication layer the program proceeds to 92 where a check is made to see if data has just recently been transmitted and, if no transmission occurred recently, the program proceeds to 124 where data equal to current award amount (current jackpot amount) is read from the general parameter table and transmitted to any local peripherals by a unit 35 and the program continues to 126 where a determination of whether any bets (coin-in) were placed upon a gaming apparatus to which the monitor running the program is attached during time the program was monitoring the communication layer. If no bets were placed, the program returns to 88, if bets were placed, the program continues to 122 where a new progressive jackpot amount is calculated; program continues to 120 where a flag is set to cause the program transmit data onto the communication layer and a delay buffer is loaded to cause the program to look for a response to a transmission of the general parameter table that the program will cause to be made. The program proceeds to 88, transmits the general parameter table with updated information and, if the delay buffer is not equal to zero, waits for a response prior to transmitting data again. If a response is received, the response is parsed at 94 to determine if it is an ACK which indicates a good transmission was received upon the progressive meter network and if data received does not indicate that good data was received, the program proceeds back to 88 to wait for indication of good data or a timeout of time to listen. If an indication of a good transmission is received at 94, the program continues to 96 where a determination is made of whether a record of bets placed upon the gaming apparatus were placed into a primary or secondary buffer location; if placed into primary location, the primary location is cleared at 98 and if placed into a secondary location, the secondary location is cleared at 100. The program continues to 102 where a pointer is adjusted to point to the active record of bets is stored while the program is performing the prior steps, the program continues to 104 where a flag that causes the program to transmit onto the communication layer is disabled, transmit delay buffer is cleared at 106 and the program continues on to 108 where a buffer is updated with a number of coins that may have been bet upon the gaming apparatus while the program was performing the prior steps. Program exits at 110.

The explanation of a program segment illustrates a principle that may be applied to any other dynamic data upon a progressive meter network according to the present invention:

1) Multiple sets of data are maintained and while one set of data is being employed to update a field in the general parameter table, another set of data is being updated by a program running on the monitor so as to assure that no monitored event is missed.

2) A monitor transmits a copy of the updated general parameter table and waits for a response from other monitors included within the progressive meter network. Any monitor may respond to a received message in one preferred embodiment.

3) In one embodiment, all monitors are assumed to have received a message if one monitor receives a message since all monitors are attached to the progressive meter network. A well-known example of a network of the type described is I2C or Computer Area Network.

4) In an embodiment of a network that employs token passing, the updated general parameter table may be passed as a token to another monitor and will receive a response that the other monitor has received the updated general parameter table in good order.

5) In both embodiments the general parameter table is updated by each monitor to reflect all activity upon all monitors included within the progressive meter network and, thus, accurate data is available to all monitors within an infinitesimally small period of time. Yet, no central controller is required.

A flowchart representation of a portion of a computer program that may be running upon a monitor for purposes of counting bet amounts according to the present invention is shown in FIG. 6 and begins at 128. The computer program segment is of a type generally classified as an interrupt service routine (ISR) and is generally invoked when an event, a coin bet in this case, interrupts normal program flow; part of which may be the previous flowchart beginning at 86. From 128, the program proceeds to 130, where verification that a bet was really recorded; if no bet was recorded, program exits at 148 and if the bet was recorded, program continues to 132 where a flag is checked to record the bet in the active buffer at 136 or 138. Program then continues to 140 where communication layer 38 of the progressive meter network is scanned for activity and, if no activity is detected, the program exits at 148. If activity upon the communication layer is detected at 140, the program continues to 142 where a flag location is checked to see if the program is already causing data to be transmitted and, if data is being transmitted, the program exits at 148; if data is not being transmitted, the program continues to 142 where provision is made to prepare to transmit data just gathered. At 143 a flag is adjusted to direct any further data gathered to be placed into another buffer, program continues to 144 where bet data is summed with any previously gathered bet data not previously transmitted, program continues to 146 where a flag is set to cause data to be transmitted by the main program running on the monitor and program exits at 148.

If electrical power to the progressive meter network is interrupted, data in the general parameter table of each monitor is saved in nonvolatile memory. Upon resumption of electrical power, a voting procedure may occur between all of the monitors included within the progressive meter network and all general parameter tables will be adjusted to the values that existed prior to interruption of power. Recovery of general parameter values after a power outage is increased greatly by a system as described in the present invention over conventional systems that employ a central controller in which several copies of general parameter values and all the parameter values are stored in one location. In the present invention there are as many copies of the general parameter table as there are monitors included on the system and each monitor may include multiple copies of the general parameter table.

Security in the progressive meter network of the present invention is also greater than security in generally known progressive meter networks. Transmission of data on serial communication bus 38 may be encoded. The encoding and decoding may be by public key 51 and security parameters 60 or by other well-known techniques. Security parameters may also include a unique electronic identification number for each monitor included within the progressive meter network. A monitor may not be included upon the progressive meter network unless predetermined authentication procedures have been performed. A monitor that has not been properly authenticated will be ignored and may not participate in the operation of the progressive meter network. All monitors may gather and store information concerning certain memory and operational checks of all other monitors included upon a progressive meter network, the information may be stored in nonvolatile memory location 60. At random or predetermined times such as transmission of an "I'm here" sequence previously described, monitors may crosscheck security information of other monitors upon the progressive meter network. If a monitor does not contain security information that was previously authenticated to the other monitors upon the progressive meter network and has not specifically been authorized to the network to have different security information by performance of a predetermined authentication sequence, the monitor may be excluded from participation on the progressive meter network and may enter a standalone mode of operation. In a worst case, all monitors may enter the standalone operational mode until a predetermined authorization action is performed. The manner of exposure reduces intentional security breaches and players falsely claiming a large monetary award.

Consider now a wide area progressive network (WAP) including the principles of the present invention described previously. Real time clock 33 included within monitor unit 20 may be a very precise oscillator or may be synchronized with a time standard such as a time standard provided by the U.S. Naval Observatory or a local time standard may be implemented in one location and a time synchronization signal transmitted on the progressive meter network. An example of a precise oscillator that could be used for a local time standard is a Datum X72 rubidium oscillator manufactured by Datum of Irvine, Calif. The precise oscillator is exceptionally stable and has a stability and resolution that is in the order of pico seconds. The rubidium oscillator is also cost effective and can be easily included upon a modern circuit board.

Coordination and tracking of events upon a WAP is generally accomplished by leased lines and depends upon speed of communication to assure synchronization of sites included within the WAP. The present invention eliminates need for very rapid communication with a central site and instead synchronizes events between participants upon the network by using a very precise time base. Another advantage of precise time signal availability upon any progressive network is that a timestamp of a major event, such as win of a large award, may be accomplished. Measurement of time of occurrence of the event even within precision of millisecond allows resolution of multiple events occurring nearly simultaneously. A disadvantage of conventional progressive meter systems is that they do not have a method of precisely determining time of occurrence of an event that may cause payment of a large award. Should a second event identical to the first event occur upon a second gaming apparatus connected to a present-day progressive network and the second event occur in less than 1 or 2 seconds, there is no way of determining which player really won maximum award displayed and which player should receive the award equal to the meter reset value. In situations such as just described, generally a disagreement ensues and the maximum award is split between "simultaneous" winners or each player of a winning game receives the full amount of the maximum award. In fact, various instances of maximum award disagreements are known to have been decided by the courts.

The present invention solves the disadvantage of the unavailability of a precise time signal to all monitors included within the progressive meter system. When a major event, such as win of maximum award displayed occurs, a time of occurrence precise at least to microseconds is stored by a monitor connected to a gaming apparatus upon which the win was generated. The monitor transmits data to its connected network to indicate that a win of maximum award has occurred and a reset of all amounts available for win displayed is adjusted to a reset amount 44 in the general parameter table of all monitors. If a win of maximum award occurs, or has occurred, prior to reset being accomplished, timestamps corresponding to each event are compared by the monitors connected to each apparatus indicating the win and resolution of an amount of award to be given to each winning player can be easily accomplished with no human intervention.

Presently a return to display of a reset amount available for win by a plurality of devices included within a progressive network is a matter of concern. There is always a concern upon the part of an operator that the reset amount may not be displayed quickly after a reset has occurred and that another player may make a claim for a larger amount previously displayed. The situation just described is especially of concern in a WAP and is of no concern if the method of timestamps as described in the present invention is employed in a link progressive system confined to one location. Concern of simultaneous win of a maximum award displayed is warranted due to speed of communication with all sites connected to the WAP. The present invention resolves the problem of slow communications between elements of a WAP by implementing a novel reset sequence. The reset sequence may also be applied to a local link progressive, especially to a link progressive that is implemented with a central controller.

Assume a link progressive network comprised of a total number of gaming devices equal to n. All of the devices have an equal probability p of winning a maximum award amount for every game played. For simultaneous play the probability q that the maximum award would be won is q=(np). A portion of the total number of gaming devices may be allocated to each location on a WAP or link progressive. Communications speed may not be of great concern as to simultaneous win of a maximum award and attendant problems as discussed previously if reset of an award is performed in a following manner:

1) Top award is won.

2) All gaming apparatus attached to local link are reset to and display a predetermined reset amount that is now available for win. Winning machine is locked out awaiting payment.

3) A notification is sent to all sites on the WAP that a win of maximum award has occurred.

4) All sites on the WAP reset the connected local link and the maximum award available for win is adjusted to and displays a predetermined reset amount.

The sequence described above is as is generally and typically performed now, but there are some differences performed at each step. Actual maximum award available (MaxJackpot) for win is multiplied by a factor to account for an operator's confidence that simultaneous jackpots will not occur. As an example assume 0.50 which allows for occurrence of two simultaneous jackpots. Maximum award available for a winning game would be (MaxJackpot)(0.50) and this is the amount that would be displayed to players and would be total jackpot amount to be displayed 42. MaxJackpot (0.5) would be placed in a pool called BackJack and will continue to increase as the maximum award increases as calculated by the formula just given. Typically odds of winning a maximum award available on a WAP are very small, and with a large number of machines included, the maximum award grows rapidly. When win of a maximum award occurs, all maximum awards on the local link progressive network in which a winning game participates reset to and display a predetermined reset amount. If there are a number of machines in the local link progressive network equal to A, then probability that a second jackpot could occur and be counted as a simultaneous jackpot since other sites on the WAP have not been notified to reset the maximum jackpot amount is q=(n−A)p) for simultaneous play of all machines. Decreased odds that a jackpot will be hit and counted as a simultaneous jackpot for pay purposes may be taken into account and some funds in BackJack may be released to the winning player. The released funds can be released slowly and cause a win amount for the winning player to grow incrementally. As more sites connected to the WAP are reset to the predetermined reset amount, confidence that a simultaneous jackpot will not occur increases and more funds can be released from BackJack to the jackpot. Maximum benefit from this approach occurs if all progressive link networks included within a WAP can be set to the reset amount prior to all funds being taken from the first release of funds from BackJack to the first winning player. If reset occurs at all progressive link networks included on the WAP then an operator of games is assured that no claim for a simultaneous jackpot can occur and can release all funds in BackJack to the winning player.

Figure 7:
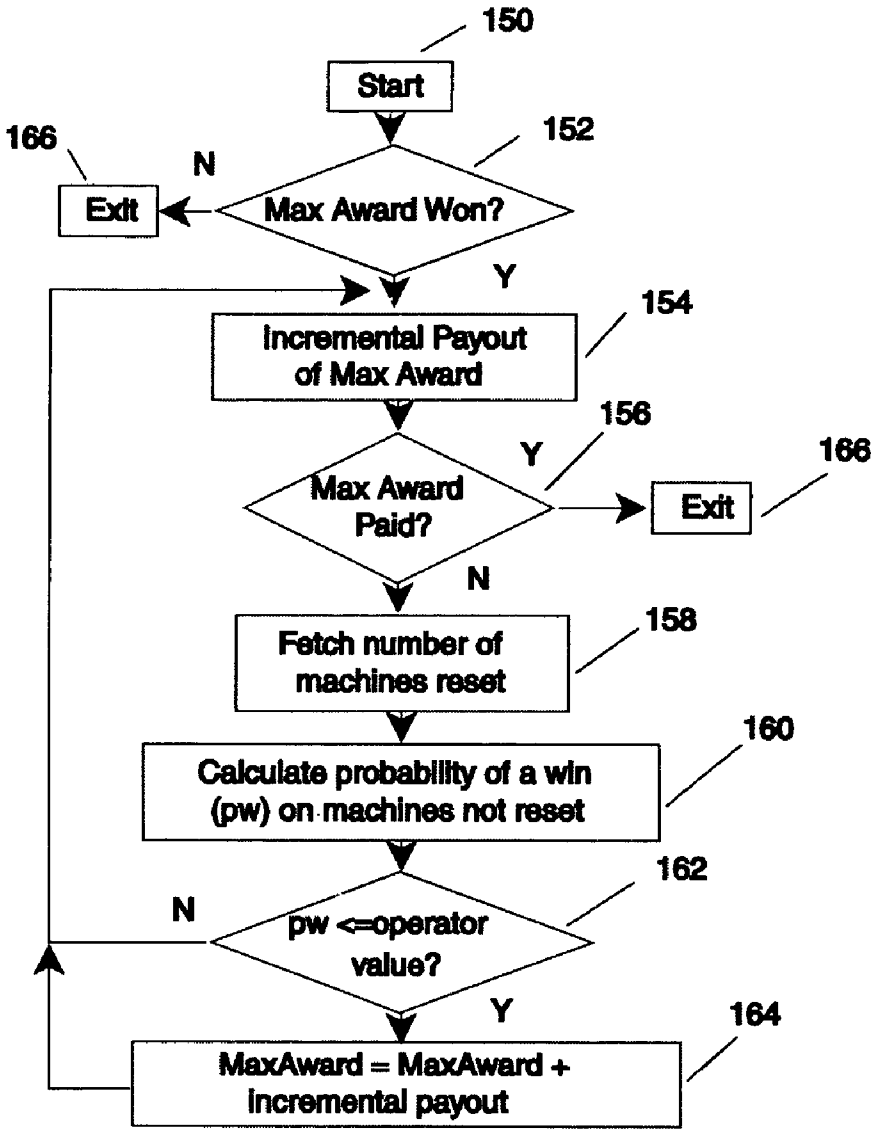
FIG. 7 is a flowchart representation of a program flow, in accordance with an exemplary embodiment of the present invention, that may run upon a progressive meter network for resetting the link progressive network to a predetermined value.

Turning now to FIG. 7, which is a flowchart representation of a program flow for a program that may run upon a WAP or progressive meter network; the flowchart is an illustration of a method for reset to start value of link progressive system. Program begins at 150 and continues to 152 to see if a maximum award has been won, if no maximum award has been won, program exits at 166; if a maximum award has been won, program continues to 154 where an incremental pay is started of the maximum award as displayed upon all systems included in the WAP or progressive meter network. The maximum award may be shown to players as being only a portion of actual maximum award that is available. Pay procedure at 154 may be such that a period of time elapses, as pay is incremented toward a final value that will be paid to a winner of the maximum award. The period of time is valuable to operation of the WAP to allow communication between all points included upon the WAP to be notified that a maximum award has been won and that all points should reset displayed amount available for win to a predetermined reset value. Program continues to 156 where determination of payment of maximum award is made and, if entire award available has been paid, the program exits a 166; if payment of maximum award has not been completed, then the program continues to 158 where a determination is made of number of gaming apparatus included in the WAP that have been notified of the win of maximum award and reset. The program continues to 160 where a calculation of probability of a win on a gaming apparatus that has not been reset is made, and if the probability of a win is greater than a predetermined threshold probability, the program returns to 154. If the probability of a win is less than the predetermined threshold probability, the program continues to 164 where another portion of an incremental payout is added to the maximum award currently being paid out; program then continues to 154. The previous procedure has an effect of creating a constantly increasing visual display of an amount to be paid to a winning player. Entire amount of the actual maximum award may be made to the winning player with the effect that the player is paid substantially more than he originally was notified he would win. Additionally the award is displayed as increasing over a time period, which enhances player suspense and enjoyment and also allows all machines on the WAP to be reset and prevent exposure of an operator to possibility that multiple wins of the same maximum award may be made simultaneously.

Figure 4:
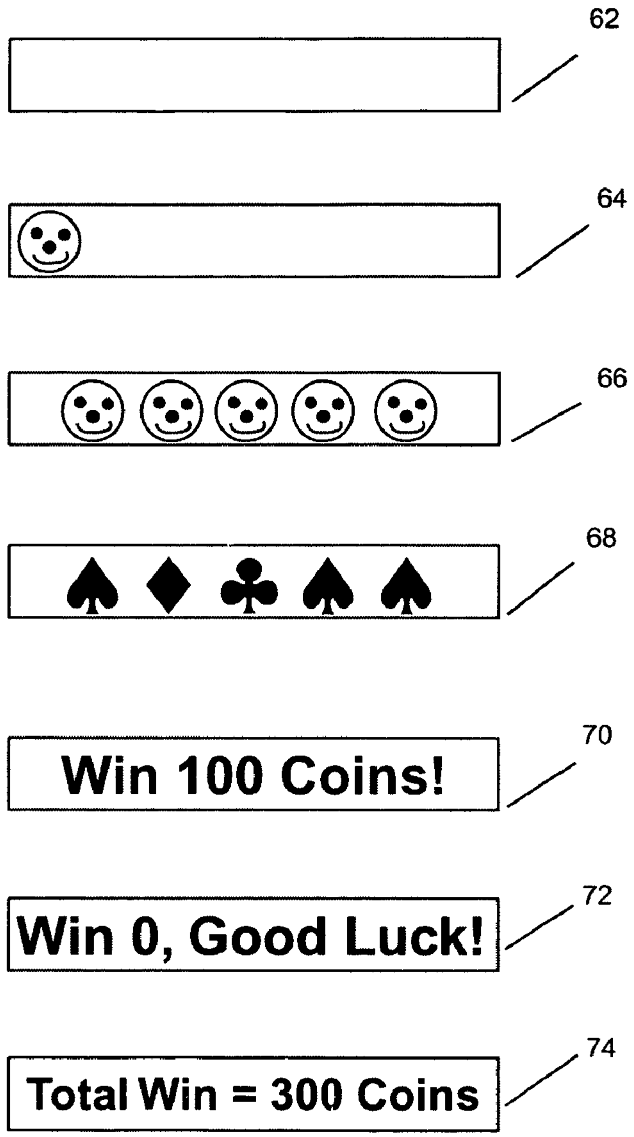
FIG. 4 is a representation of a sequence of play of a bonus game according to an exemplary embodiment of the present invention.

Turning now to FIG. 4, which is a representation of an auxiliary (bonus) game that may be played upon a link progressive network or upon a standalone progressive. In the present invention a member of a link progressive may participate in the link progressive game and/or play a standalone game of its own. The auxiliary game may be played on an in-game meter, which is typically a display that is placed into a gaming apparatus for purpose of showing an amount available for a win of a progressive prize. The auxiliary game is designed to provide interaction with a player of a gaming machine and to have no dependence upon the outcome of a primary game played upon the gaming machine. A listing of actions as the auxiliary game proceeds may be as follows:

1) If auxiliary game is completed, clear the display as illustrated in 62.

2) If a maximum bet has been made for the game played upon the gaming apparatus, draw a random number.

3) In accordance with a method described in U.S. Pat. No. 5,380,008, U.S. Pat. No. 6,053,813 or any other well-known method of random symbol selection, compare the random number drawn in step 2 to determine a symbol to draw.

4) Store the symbol drawn in (3).

5) Display a generic icon on the display as illustrated in 64.

6) Continue steps 2-5 until a predetermined number of maximum bet games have been played upon the gaming apparatus. As illustrated in 66, the predetermined number of maximum bet games is 5, but this is not a limitation otherwise.

7) Upon next maximum bet game played upon the gaming apparatus to which the in-game meter is attached, display all symbols drawn in (3) in order. A representation of the display is in 68.

8) Accrue any award due the player in a nonvolatile memory location in the monitor attached to the gaming apparatus. An example of a winning display is illustrated in 70 and an example of a losing display is illustrated in 72.

9) Return to (1) and begin the described sequence again.

A total of a player's accrued winnings due to the auxiliary game sequence may be displayed as illustrated in 74. No dependence upon a game being played upon a gaming apparatus to which the auxiliary game is attached is required except for a predetermined knowledge of how many coins constitute a maximum coin bet. A player may collect his winnings from the auxiliary game just described by using a secure radio frequency transponder that in a preferred embodiment may be a component of a TIRIS series manufactured by Texas Instruments. In FIG. 2 peripheral device 41 may be a reader module of type RI-STU-MRDI manufactured by Texas Instruments. Payment for winnings occurs at a casino cash cage at which the secure radio frequency transponder is read, winnings are converted into cash-to-player and the radio frequency transponder is reset to zero. No dependence upon the gaming apparatus to which the auxiliary game is attached is required for payment of winnings.

The auxiliary game just described increases player enjoyment since it costs a player no visible deduction from his bet, nor does it require any attention to play on the part of the player. It is just a bonus game at which a player can win a substantial amount. An operator of a gaming machine may adjust the hold of the gaming apparatus onto which the auxiliary game just described is installed to be that of a standalone progressive or in any other manner, as operational philosophy requires.

Figure 5:
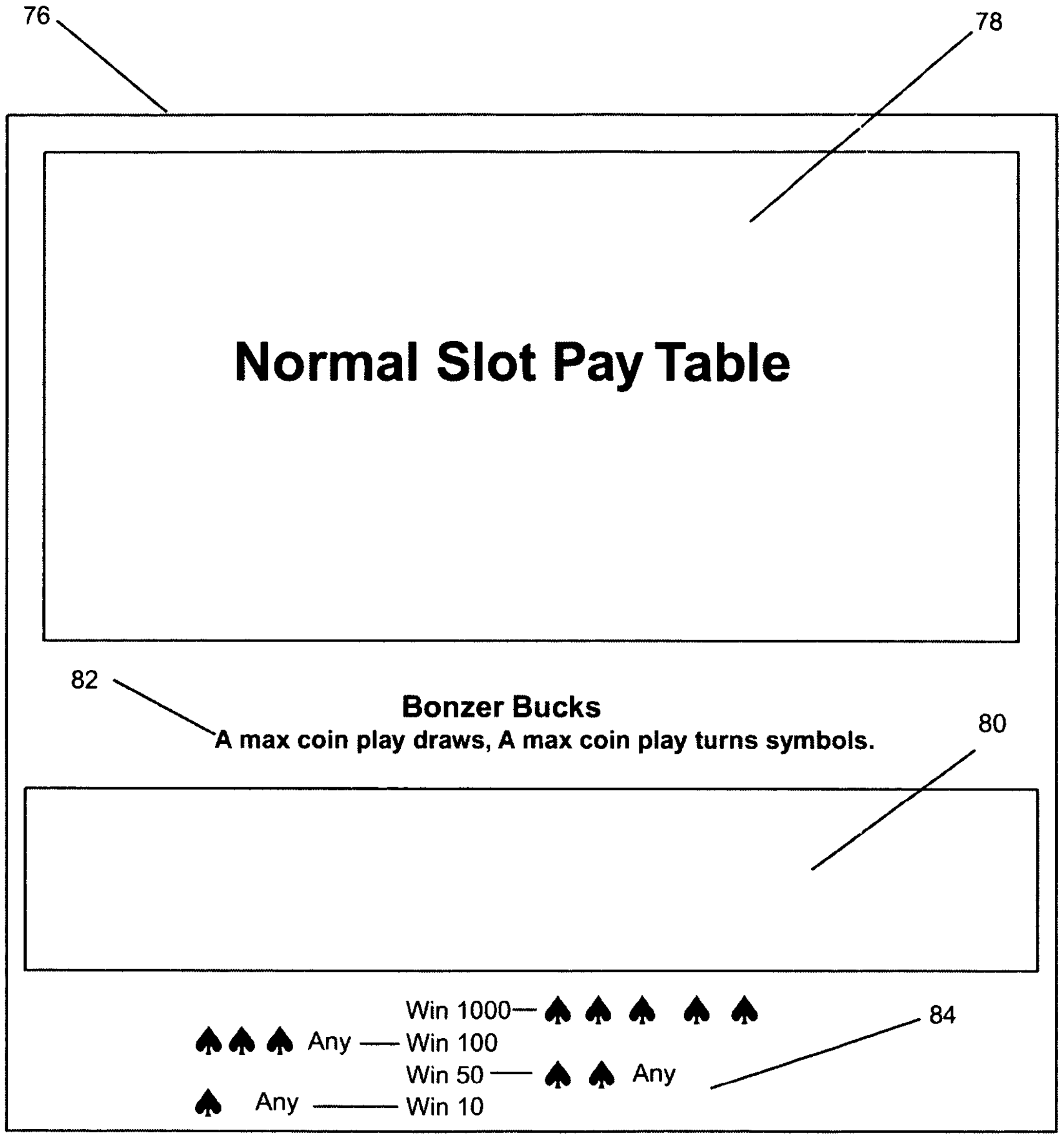
FIG. 5 is a representation of an award panel used in a gaming apparatus including a bonus game according to an exemplary embodiment of the present invention.

Turning now to FIG. 5, which is representation of an award panel 76 commonly used in a gaming apparatus; a normal award table or pay table as is generally employed in the gaming apparatus is represented by 78, an in-game display 80 may be used to display auxiliary game symbols as they are drawn according to each game, rules of the game 82 may be as posted and inform a player as to how the auxiliary game is played, award table for the in-game meter 84 may be as shown. No change is made to the award table for accommodation of the auxiliary game and consequently minimal time should be required in jurisdictional technical approval of the auxiliary game.

The auxiliary game played standalone upon the in-game meter previously described may also be played upon a link progressive network. A progressive meter network of the type described in the present invention is particularly advantageous. The auxiliary game as described previously may be operating upon any gaming apparatus included within the link progressive network. As many instances of the auxiliary game may be played as an operator of the progressive meter link allows. One method of playing the auxiliary game previously described is to have a monitor generate a random number and map the random number to an electronic identification number of a monitor on the progressive meter network (selected monitor). If the selected monitor is attached to a gaming apparatus that is actively being played a flag is set in miscellaneous game parameters 59 of specific parameter table 23 and it is transmitted to the link progressive network, all monitors included in the network will receive the specific parameter table, but only a monitor whose electronic identification matches an identification in the specific parameter table will act upon the flag. The monitor that has a matching identification will begin an auxiliary game similar to the standalone game previously described, but will prompt a player at the connected gaming apparatus that only a predetermined amount of time is available for playing the auxiliary game. When the auxiliary game played on the in-game meter is complete or time-out has occurred, the monitor at the connected gaming apparatus generates a random number to select another monitor to play the auxiliary game and transmits a packet onto the progressive meter network. Multiple instances of the auxiliary game previously described can be running simultaneously upon the progressive meter network since each instance is generated and controlled by a monitor attached to a gaming apparatus that is being played.

In one embodiment of a monitor 20, microcontroller 31 may be of a type DS89C420 manufactured by Dallas Semiconductor, machine interface 34 and peripheral interface 35 may be of a type MAX488E manufactured by Maxim, command access port 36 may be of type MAX221 E and a MAX488E manufactured by Maxim, RTC 33 may be of a type DS1305 manufactured by Dallas Semiconductor, non-volatile memory 30 may be of a type STK12C68 manufactured by Simtek and bus communication layer interface 32 may be of a type UC5350 or SN65HVD251 manufactured by Texas Instruments. All components included within the embodiment are familiar to one skilled in the art and connecting them in a manner to realize a monitor as described herein will be obvious. In another embodiment of a monitor, an in-game progressive meter as manufactured by Aurora Enterprises may be employed. A program including elements of a flowchart described in FIG. 6 may be loaded into program memory of the progressive meter and numerous in-game meters running the program may be interconnected as shown in FIG. 2 to construct a progressive meter system of the present invention.

An embodiment of the auxiliary standalone game described may be an Aurora Enterprises in-game progressive meter. The progressive meter includes a microprocessor, non-volatile data memory, program memory and a method to communicate with a gaming apparatus and a serial system bus. Program memory may be configured to cause the Aurora Enterprises in-game progressive meter to operate as an auxiliary game according to the previous description.

While the above is a complete description of exemplary specific embodiments of the invention, additional embodiments are also possible. For example, the aforementioned gaming devices may be provided with communication devices, e.g., for purposes for accounting, maintenance, management, security, controls, updating and the like. Thus, the above description should not be taken as limiting the scope of the invention, which is defined by the appended claims along with their full scope of equivalents.

What is claimed is:

1. A progressive gaming system comprising:

a first gaming device having an input device, a display and a controller, wherein the first gaming device is configured to receive a wager from a first player to play a progressive type game; and a second gaming device having an input device, a display and a controller the second gaming device being communicably coupled to the first gaming device, wherein the second gaming device is configured to receive a wager from a second player to play the progressive type game, wherein the first and second gaming devices exchange, with each other, information associated with the amount of wagers placed by the first and second player on each respective gaming device by exchanging an electronic data packet of a predetermined format, in order to determine the total jackpot amount to be won, wherein determination of whether the first player has won, and the total jackpot amount to be paid to the first player is performed by the controller of the first gaming device, and wherein determination of whether the second player has won and the total jackpot amount to be paid to the second player, is performed independently of the first gaming device, by the controller of the second gaming device.

2. The system of claim 1 further comprising a first and a second precise time base, each configured to measure time of occurrence of events on the first and second gaming devices, respectively, with a resolution of picoseconds.

3. The system of claim 1 wherein the first gaming device is capable of initiating a secondary bonus game independent of the second gaming device and the second gaming device is capable of initiating a second bonus game independent of the first gaming device.

4. The system of claim 3, wherein the secondary game initiated by the first gaming device has no dependency upon an outcome of the progressive type game.

5. The system of claim 3 further comprising a first secondary game device communicably coupled to the first gaming device for initiating the secondary bonus game, wherein the first secondary game device further comprises a display device, a random number generator, and a unit for calculating a value to determine a game outcome based upon use of generated values of said random number generator in a predetermined formula.

6. The system of claim 3 further comprising:

a unit for choosing a random number in accordance with a predetermined selection process and mapping said random number to a symbol in accordance with a predetermined mapping process if the number of game plays of maximum bet in a play sequence is less than a predetermined maximum; and a display device for displaying a generic icon as a placeholder to allow progress of the secondary bonus game to be ascertained.

7. The system of claim 1 wherein the first gaming device and the second gaming device communicate on a peer-to-peer basis.

8. The system of claim 1 further comprising a first and a second precise time base, each configured to measure time of occurrence of events on the first and the second gaming devices, respectively, with a resolution of 10-15.

9. A progressive gaming method comprising:

providing a first gaming device having an input device, a display and a controller, wherein the first gaming device is configured to receive a wager from a first player to play a progressive type game;

providing a second gaming device having an input device, a display and a controller, the second gaming device being communicably coupled to the first gaming device, wherein the second gaming device is configured to receive a wager from a second player to play the progressive type game;

transmitting information about the wager placed by the first player from the first gaming device to the second gaming device to the second gaming device;

transmitting information about the wager placed by the second player from the second gaming device to the first gaming device, wherein said wager information is transmitted by using an electronic data packet of a predetermined format, in order to determine the total jackpot amount to be won based on the wagers;

determining, by using the controller of the first gaming device, whether the first player has won and the total jackpot amount to be awarded to the first player; and determining, by using the controller of the second gaming device independently of the first gaming device, whether the second player has won and the total jackpot amount to be awarded to the second player.

10. The method of claim 9 further comprising:

broadcasting a parameter block of the predetermined format to all gaming devices;

when conditions change at any gaming device, updating said parameter block according to the change in condition at said gaming device; and broadcasting an updated parameter block from the gaming device to other gaming devices communicably coupled thereto to update operational parameters at each gaming device based upon the updated parameter block received.

11. The method of claim 9 further comprising:

upon determining that the first player has won, awarding a portion of the jackpot indicia to the first player;

resetting all of the gaming devices; and awarding a remainder of the jackpot indicia to the first player when all gaming devices are confirmed to be reset.

12. The method of claim 11 further comprising awarding a portion of the remainder of the jackpot indicia as the gaming devices are being reset but not yet confirmed as reset.

13. The system of claim 9 further comprising exchanging, between the first and second gaming devices, a total amount available for play to the first and the second player, prior to determining the total jackpot amount to be paid according to predetermined parameters.

* * * * *